United States Patent [19]

Smith

[11] 3,750,109

[45] July 31, 1973

[54] MULTITRACK RADAR DISPLAY CONSOLE

[75] Inventor: Richard Miles Smith, China Lake, Calif.

[73] Assignee: The United States of America as represented by the Secretary of the Navy

[22] Filed: Sept. 13, 1971

[21] Appl. No.: 179,881

[52] U.S. Cl. .................................. 340/172.5, 343/5

[51] Int. Cl. ................................................ G06f 3/14

[58] Field of Search .................. 340/172.5; 235/157; 343/5 DP, 6.5

[56] References Cited

UNITED STATES PATENTS

| | | | |
|---|---|---|---|
| 3,566,361 | 2/1971 | Lavertu et al. | 340/172.5 |
| 3,274,557 | 9/1966 | Prager | 343/5 DP X |
| 3,633,173 | 1/1972 | Edge | 343/5 DP |
| 3,504,164 | 3/1970 | Farrell et al. | 340/172.5 |
| 3,544,972 | 12/1970 | Trousdale | 340/172.5 |

*Primary Examiner*—Paul J. Henon
*Assistant Examiner*—Mark Edward Nusbaum
*Attorney*—R. S. Sciascia, Roy Miller et al.

[57] ABSTRACT

A multitrack radar display console having first and second interfaces for coupling a UNIVAC 1218 or 1219 computer to the ITT Basic Display Group. The first interface accepts the 18 bit computer words, assembles and stores them in the 36 bit word format required by the BDG and, on command, transfers the 36 bit words to the BDG. The second interface permits operator originated communication with the computer.

5 Claims, 19 Drawing Figures

MULTITRACK RADAR DISPLAY CONSOLE

BACKGROUND OF THE INVENTION

The invention relates to the field of radar information display and, specifically, the display and operator control of multitrack radar systems. Prior devices, while they are able to perform somewhat similar functions, are complex and costly.

UNIVAC 1218 and 1219 computers, see UNIVAC technical manuals PX3639-1-1 (9/'66), and PX 3316-1-2 (2/'67), use eight-word groups consisting of 18-bit words, and positive logic wherein logic 1, the true state, equals 0 volts and logic 0, the false state, equals −4 volts. The Basic Display Group see "KMI05 Computer Display Oscilloscope", ITT Industrial Products Division (published, 1967), and "ITT Model CG200 Character Generator" (published, 1967), and "Model DD-101 DISPLAY CONTROLLER", ITT Industrial Products Division (published 1967), uses four-word groups of 36-bit words, and positive logic wherein logic 1, the true state, equals +8 volts and logic 0, the false state, equals 0 volts. Interfaces A and B of the present invention use negative logic, such as "Versalogic" made by Decisional Control Associates, Incorporated, wherein logic 1, the true state, equals −12 volts and logic 0, the false state, equals 0 volts.

The advantages of the present invention are its comparatively simple design and hardware features, and its capacity to perform complex operator and display functions. The console can control the multitrack radar system and display raw video and computer generated alphanumeric information on a single cathode ray tube. Additionally, the unit can internally generate simulated signals for performing self checkout or computer checkout functions.

DESCRIPTION OF THE PREFERRED EMBODIMENT

Figure 1:
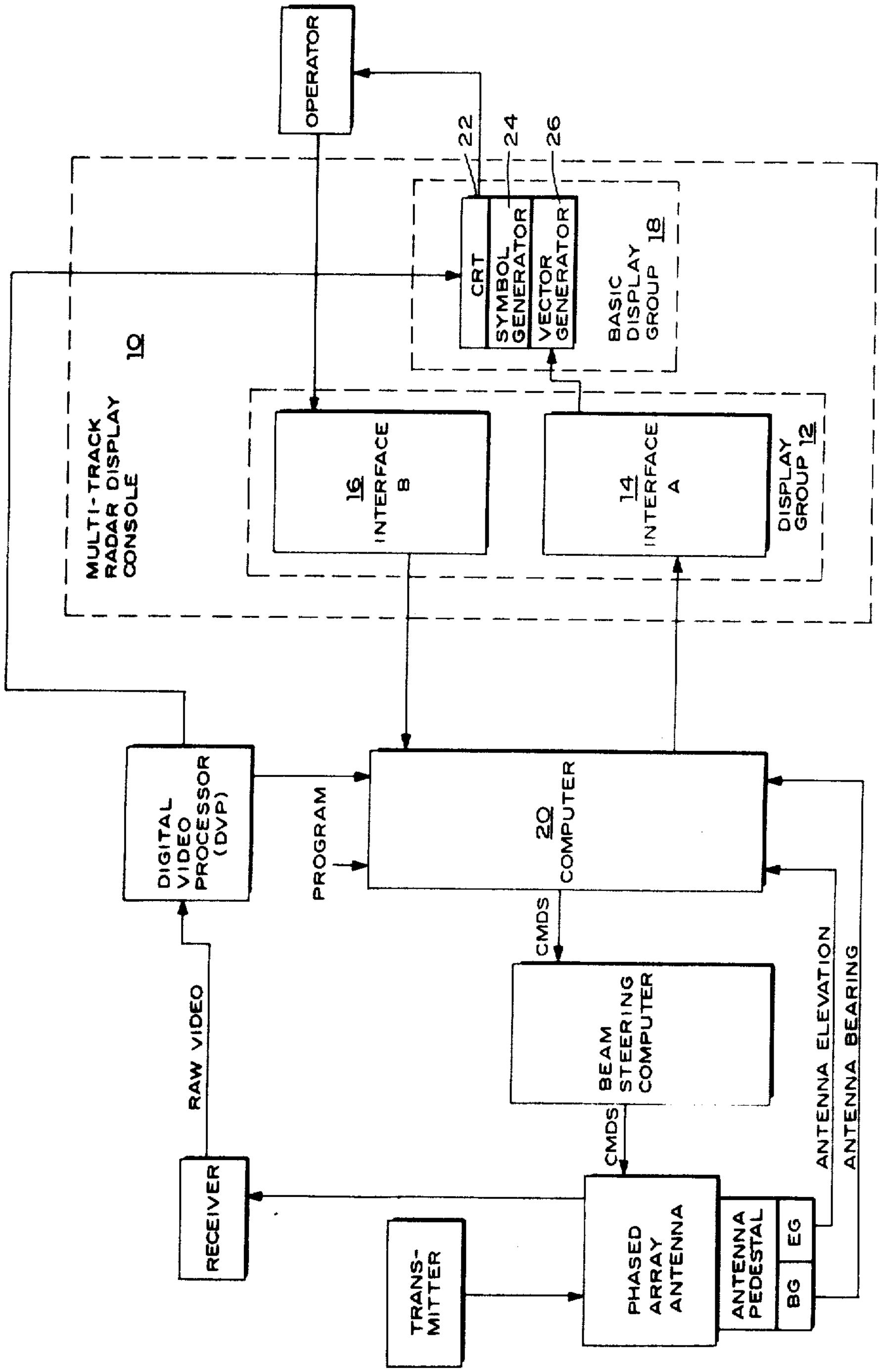
FIG. 1 is a block diagram of a multitrack radar system showing the present invention.
Figure 2:
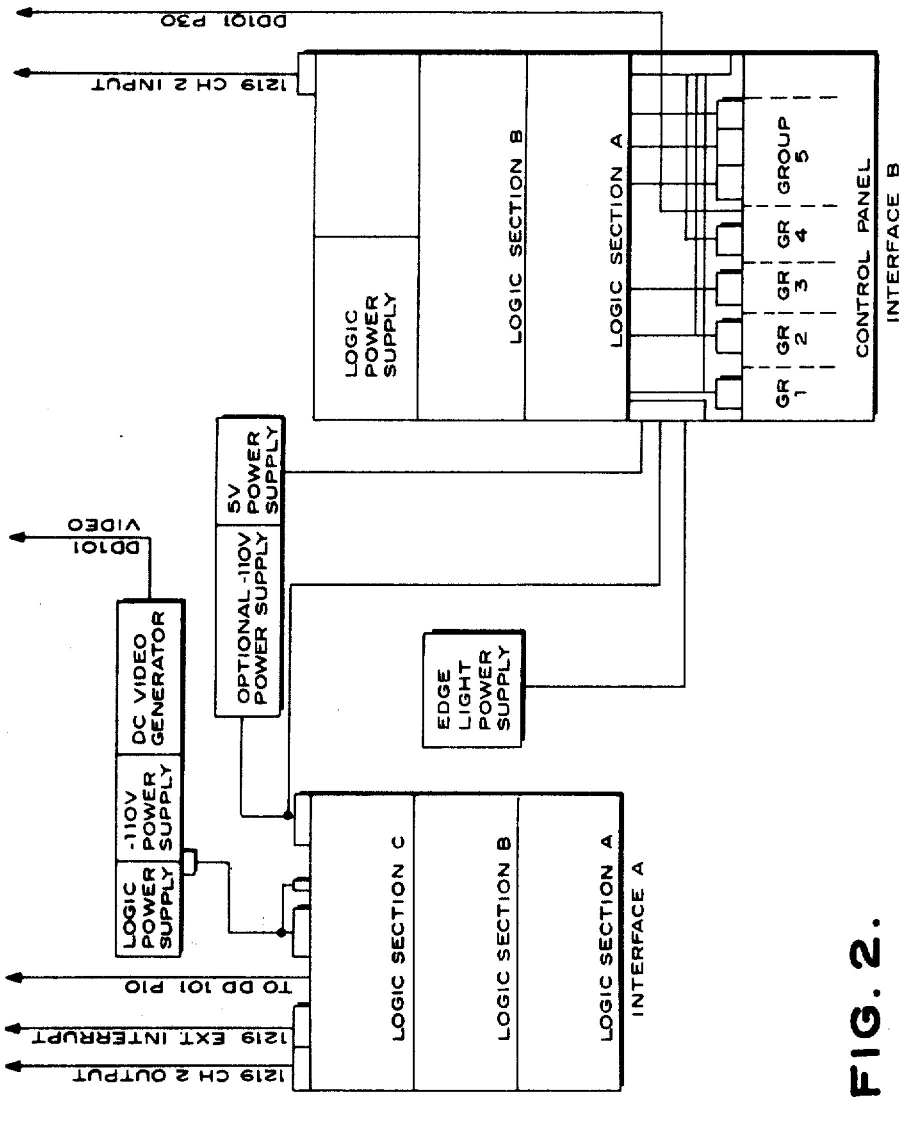
FIG. 2 is a block diagram of the multitrack radar display console of the present invention.

A block diagram of the multitrack radar system is shown in FIG. 1 and includes Interface A 14 and Interface B 16. The purpose of Interface A is to convey display instructions, target tracking and acquisition data, and general radar functioning information to the Basic Display Group (BDG) 18 from computer 20. The techniques used in this invention could be applied to essentially any display system that operates with a digital computer. INTERFACE A The structure of Interface A (display input-logic) was dictated, in part, by the nominal 1 kc radar pulse repetition frequency (PRF) rate and the choice of an 18-bit word, eight-word-group output for UNIVAC 1218 or 1219 computer 20 and the 36-bit word, four-word-group input acceptance for BDG 18. Its basic structure was further determined by the nature of the BDG chosen for the system, i.e., a unit consisting of a cathode ray tube (CRT) 22, alphanumeric and symbol generator 24, line vector generator (generates any vector in a fixed length of time) and sweep vector generator (generates a vector at a rate dependent on radar range selection) 26, and internal timing circuitry.

Because of the limited speed with which BDG 18 can display data on CRT 22, and in consideration of the display compatibility with the 1219 computer output, it was decided to arrange input to the basic display in four-word groups, each word using 36 bits. Thus data are conveyed from the computer to Interface A 14 arranged in eight-word groups, each word having 18 bits, and each group entering the interface at a nominal 1 kc rate. The words used by BDG 18 require 36 bits, but only 18-bit words are available from computer 20, hence it requires two 1219 words to make one BDG word. The input circuitry which interfaces computer 20 with display 18 was designed to make this format-conversion of computer output to appropriate display input.

The input interface (Interface A 14) is comprised of three functional types of circuitry described below, the assembly register, the timing circuitry, and the check-out circuitry.

Figure 3B:
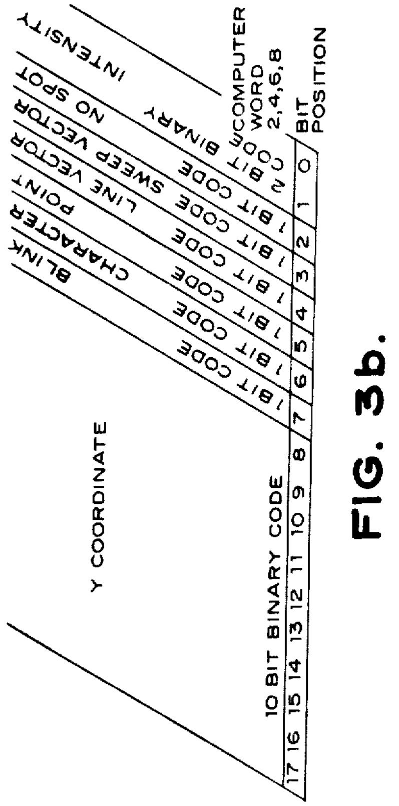
FIG. 3 *a, b, c* is a descriptive diagram of the word composition in the computer and display console of the present invention.
Figure 3A:
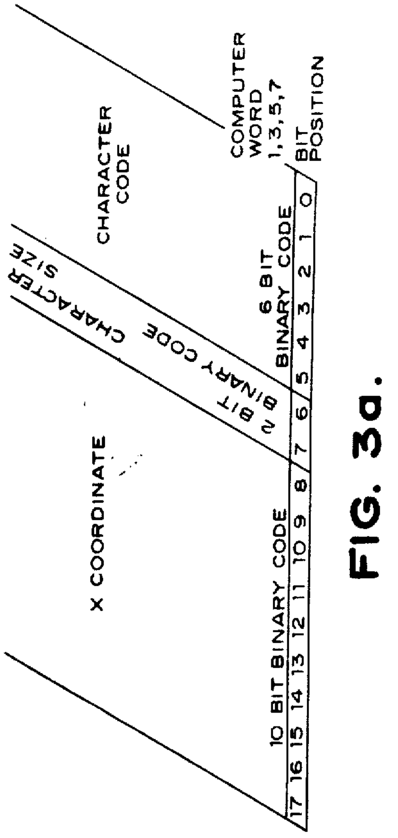
Figure 3C:
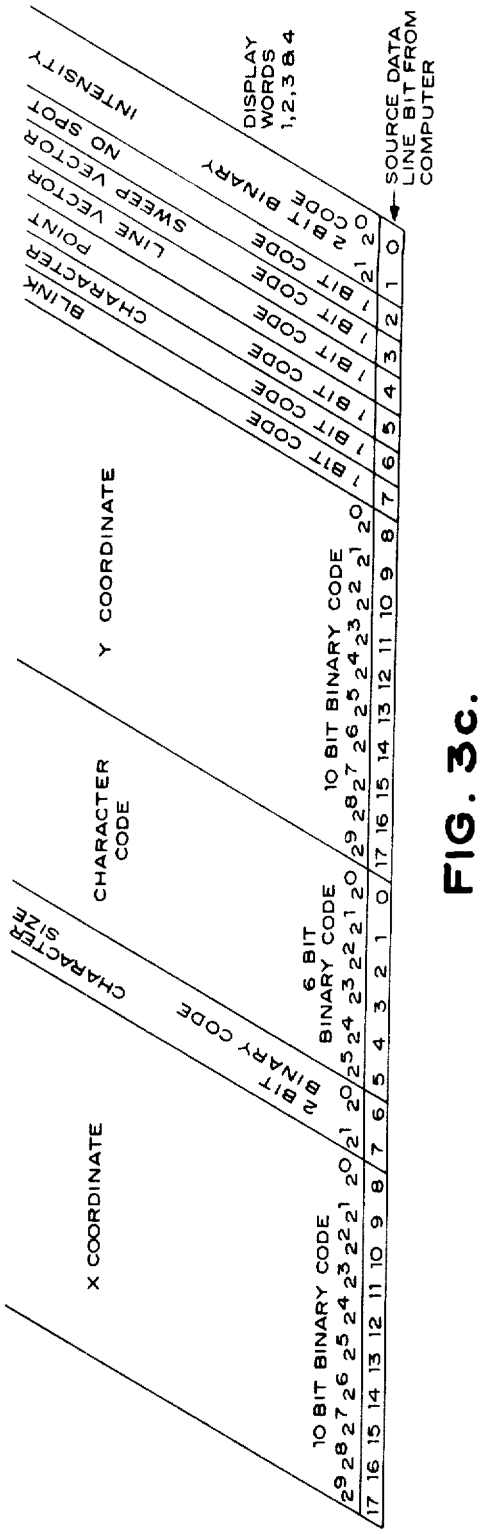

The chief function of Interface A 14, i.e., conversion of computer-processed radar data for input to BDG 18, is accomplished in the assembly register. After the radar transmits the main bang, 18-bit words in an eight-word group enter the assembly register from computer 20 with instructions to the basic display regarding the format of the display and the target data. Such instructions might designate the use of sweep vectors or line vectors, the number and size of alphanumerics, etc. Successive words of the entering eight-word group are assembled to form four pairs of words, which move in succession through the register until all eight words have been converted to 36-bit words, all forming a four-word group. These four composite words are stored, in order, until display is ready to use them. Because the assembly register alters word format not composition, the composition of computer 20 word-output is dictated by the word composition required by BDG 18. FIG. 3 illustrates this by showing that the composition of a single word-group is identical as it comes from the computer, is processed by the assembly display group 12, and then finally passes as an output to BDG 18.

The assembly register is made up of four 36-bit registers designated as Register Word 1, Register Word 2, Register Word 3, and Register Word 4. The contents of Word 1 will be output first to BDG 18, the contents of Word 2 second, and so on, successively.

The first word of a new eight-word group coming into the assembly register from the computer moves into Word Register 4, occupying the left half of the register. When the second word appears, it occupies the right half of Word Register 4. As the rest of the word-group enters the assembly register, succeeding words move into alternate halves of Word Register 4, and at the same time, the previous computer-word already occupying that half moves forward into the corresponding half of the next word-register. Thus, the eight words of a computer-output group become four composite words which move into the assembly register in halves. These four display words then move out of the assembly into the display in succession.

The Basic Display Group (BDG) 18 requires two types of data inputs (dynamic and static) when its strobe control line is activated. For $x$ and $y$ formation, data must be on the BDG input lines for the duration of the STROBE pulse (approximately 4 microseconds); the remaining data going to BDG 18 is held static in storage flip-flops (Register Word 0) until the BDG has used the preceding information and is ready for new data. Its readiness for new data is indicated when the BDG ready line becomes positive. This signal on the ready line is used to form a "ready-strobe" which initiates the movement of new data into the BDG.

The timing circuitry provides the signals for requesting data from computer 20, placing them into the assembly registers, and strobing the words into BDG 18 when it is ready to use them. The timing circuitry is also responsible for shifting the data words into their proper positions in the register each time an operation is completed.

The timing involved in the flow of data from the assembly register to BDG 18 is based upon the timing requirements for displaying a sweep vector (although a number of display elements may be used together and the sweep vector by-passed). Instructions for displaying a sweep vector always utilize the third and fourth words of a four-word group if a sweep vector is being displayed. The third word indicates where the sweep vector is to begin on CRT 22. The fourth word contains the actual sweep command and indicates where the vector is to end on the CRT. The vector placement information contained in these two words corresponds to the radar-beam direction. The beginning position of the next sweep vector (center or offset) is placed in the third word. After display receipt and processing of the third word, a "sync-strobe," dependent on the radar main bang occurs. At this time, the fourth word indicating the point on the CRT at which the sweep vector is to end enters the basic display. This initiates the sweep vector and provides the end point of the vector.

Display modes that do not use sweep vectors are available. If the display of a sweep vector is not desired, it may be omitted. In this case, the third and fourth words are used to convey other data to BDG 18. These data may take any of the other forms available for the display on the CRT, i.e., symbols, alphanumerics, and line vectors.

Figure 4:
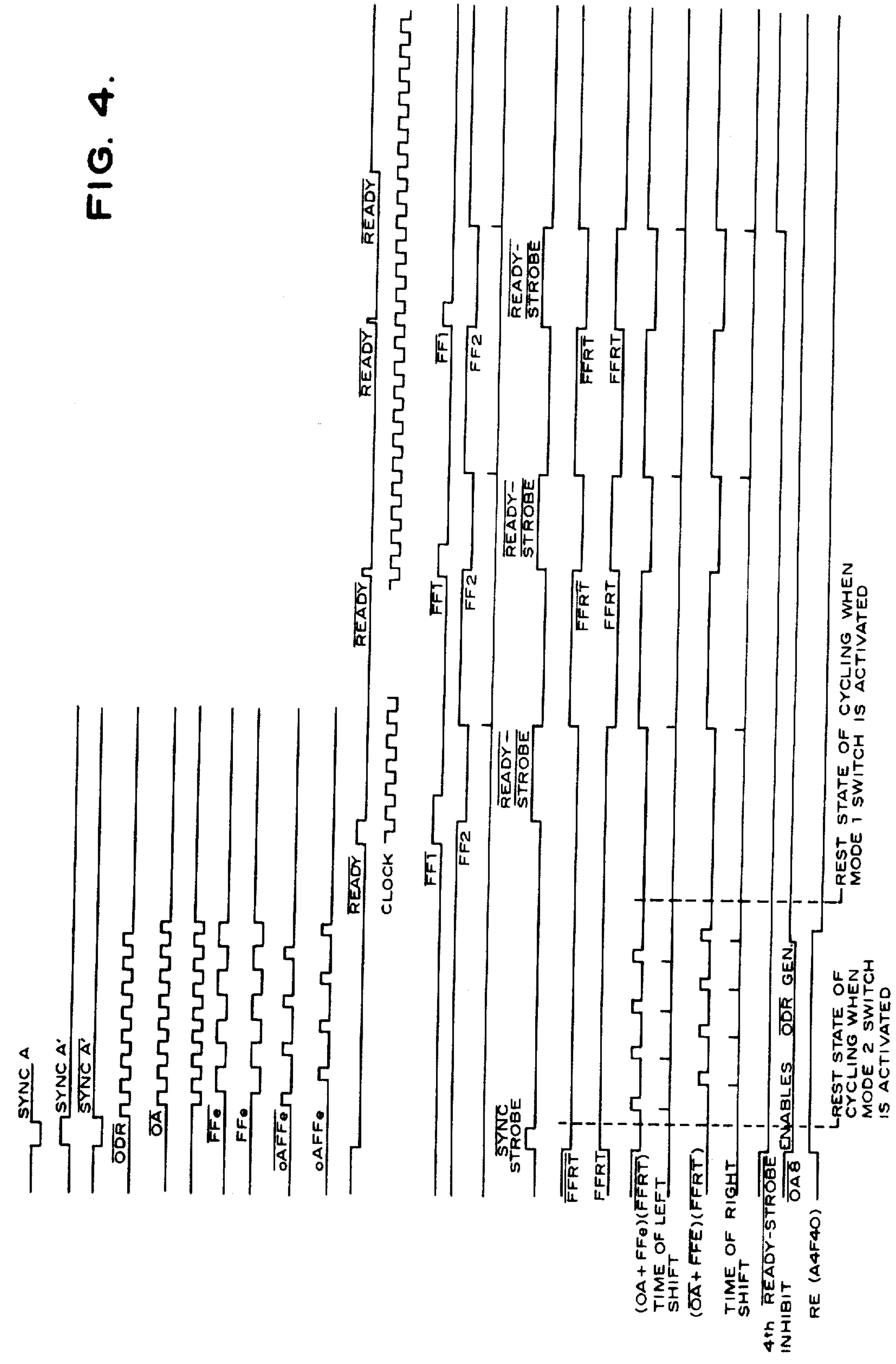
FIG. 4 shows the basic timing waveforms of the first interface (Interface A)

The basic time of Interface A 14, shown in FIG. 4, is dependent on the externally derived $SYNC_A$ pulse. As has been described, this $SYNC_A$ pulse initiates input of Word 4 from the assembly register into BDG 18. It also generates a stretched $SYNC_A$ pulse which initiates computer output of the next eight-word group to the assembly register. In addition, $SYNC_A$ pulse resets the appropriate flip flops in the timing circuitry, thus initiating each new data-transfer cycle between the computer and the BDG through Interface A. Thus, if for some reason transfer of data is not proceeding properly during a particular cycle, the next transfer cycle will not be affected.

Display Input Operation

BDG 18 requests an input from Interface A 14 by raising its READY line to a positive voltage (Logic 1) which signals the assembly register to output a word to the display. The first two words of a group may contain many types of information, including alphanumeric designation and target data. These data are most often related to target signals on sweep vectors initiated by preceeding fourth words. However, the first and second words carry any information relative to the radar's task in the form of digital commands for the display of symbols, alphanumerics and/or line vectors.

A READY is generated by the display for receipt of each successive word. After the third word has been entered and processed by the display, the READY comes up as usual, to signal the assembly register that the display is ready to accept the next word. At this time, the FOURTH READY-STROBE INHIBIT holds the fourth word in the assembly register until the main radar bang occurs. The fourth word is then strobed into the display, starting the sweep vector. A new group of words carrying instructions to the display for alphanumerics or symbols, and commands for generating the next sweep vector then proceeds from computer 20 through Interface A 14 into BDG 18. These display input-cycles continue throughout the radar's operation.

When BDG 18 has completed its action on Word 4 command (initiated by the $SYNC_A$ pulse), the READY is raised to indicate that the BDG is ready for a new word. This READY signal stays on the control line until a new word is strobed into display unit, at which time the READY line returns to ground. The READY is used to form a READY-STROBE pulse to set a new word into the display. At the end of each READY-STROBE pulse, the words in the registers shift one register toward the output register (Register Word 1). This action continues until Word 4 is in the output register. At this time, READY is inhibited from forming a READY-STROBE pulse and Word 4 is strobed into the BDG by the next $SYNC_A$ pulse generated SYNC-STROBE.

The positive going edge of the stretched negative SYNC pulse initiates an output data request (ODR) to the computer. This initial ODR starts the transfer of data from the computer to the assembly register. When the computer acknowledges the request for data by putting data on its output channel, it sets its OA control line to ground (Logic 1) with an output acknowledge (OA) signal. The computer holds data on its output channel for 2.2 microseconds and then drops the information. At this time the OA signal goes back to negative voltage (Logic 0). The negative going edge of the OA line is used to form another ODR signal. This regenerative action continues until eight words have entered the input-logic interface from the computer. (The OA counter generates a signal which limits the request for words from the computer to eight.) Circuitry which includes two delay multivibrators, shown in FIG. 6, makes possible the use of either the 1218 or 1219 computer and allows for less critical receiver card operation. The circuitry delays the apparent OA level change to allow for data settling time in the line receivers and creates a pulse from the delay level change.

Figure 6:
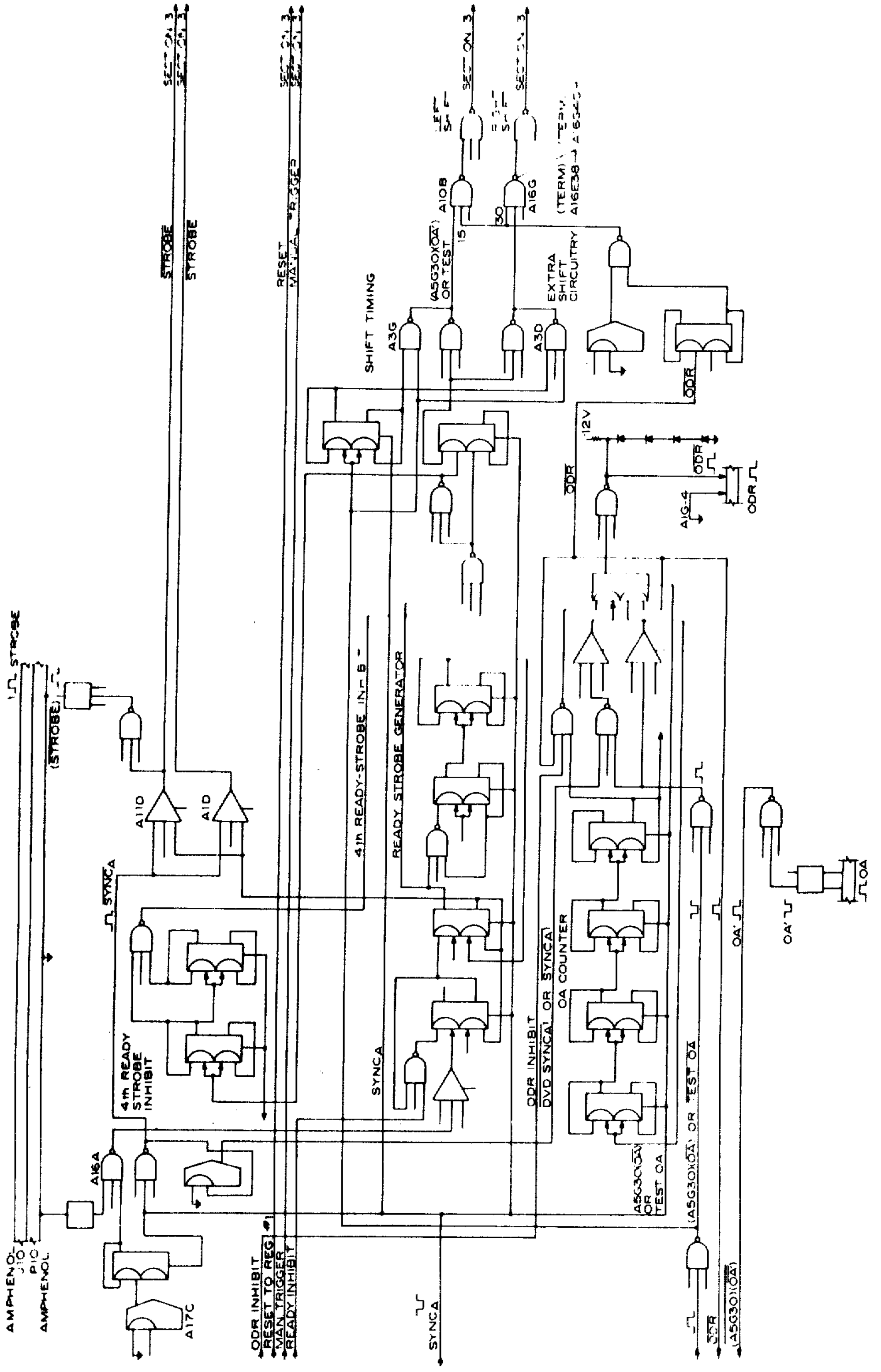
FIG. 6 is a schematic diagram of Interface A Section 2 logic.
Figure 7:
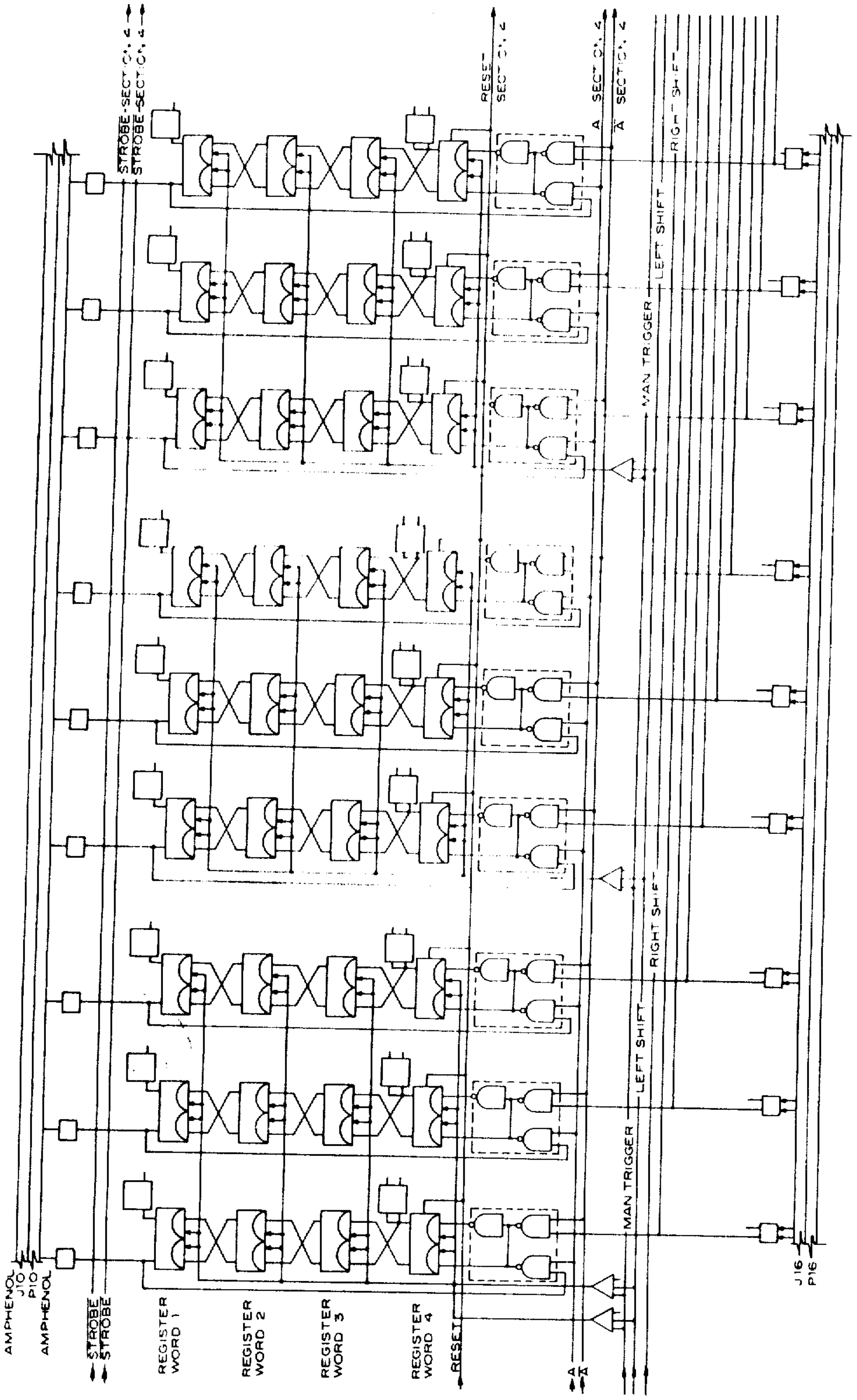
FIG. 7 is a schematic diagram of Interface A Section 3 logic.
Figure 8:
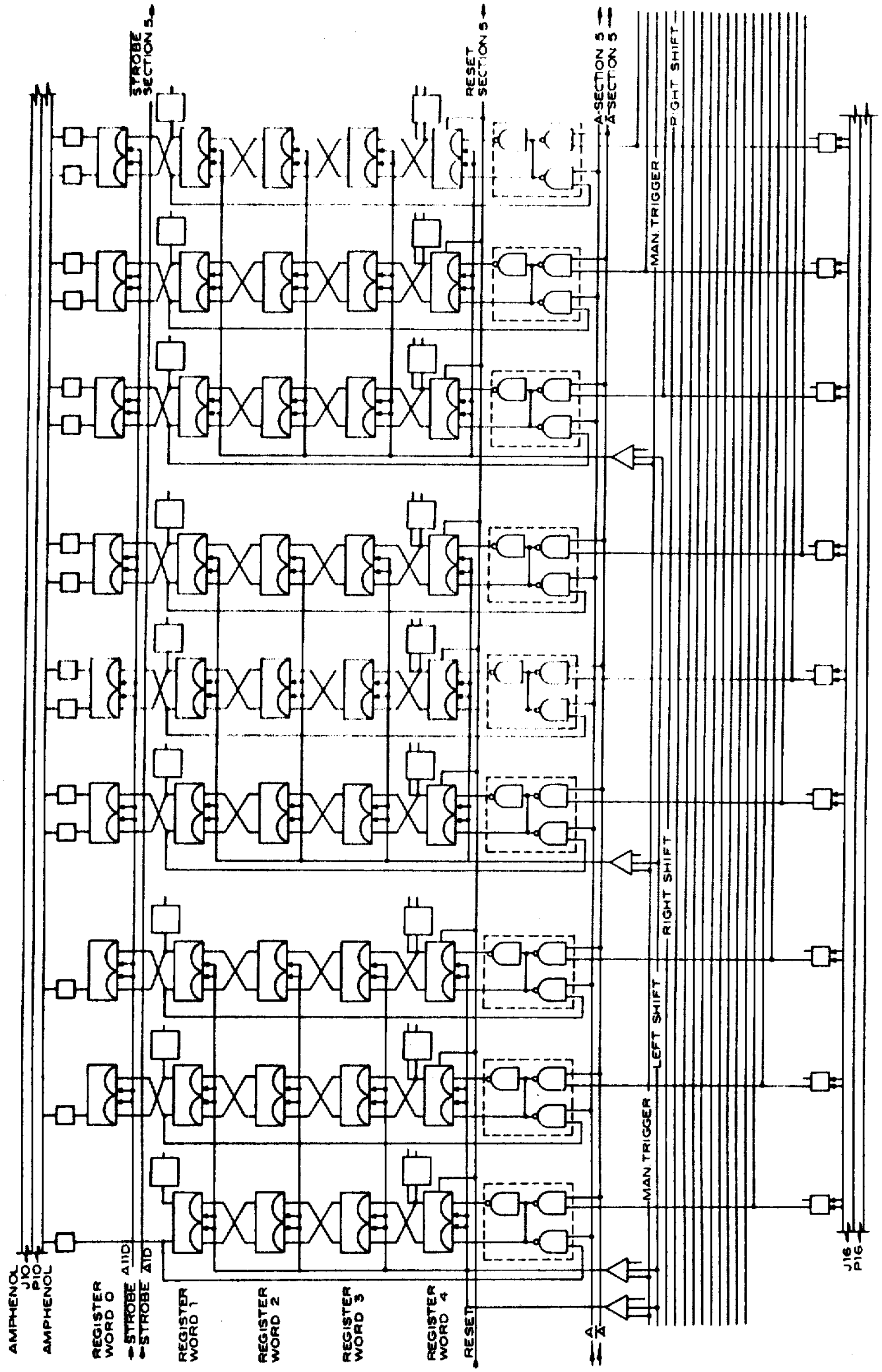
FIG. 8 is a schematic diagram of Interface A Section 4 logic.
Figure 9:
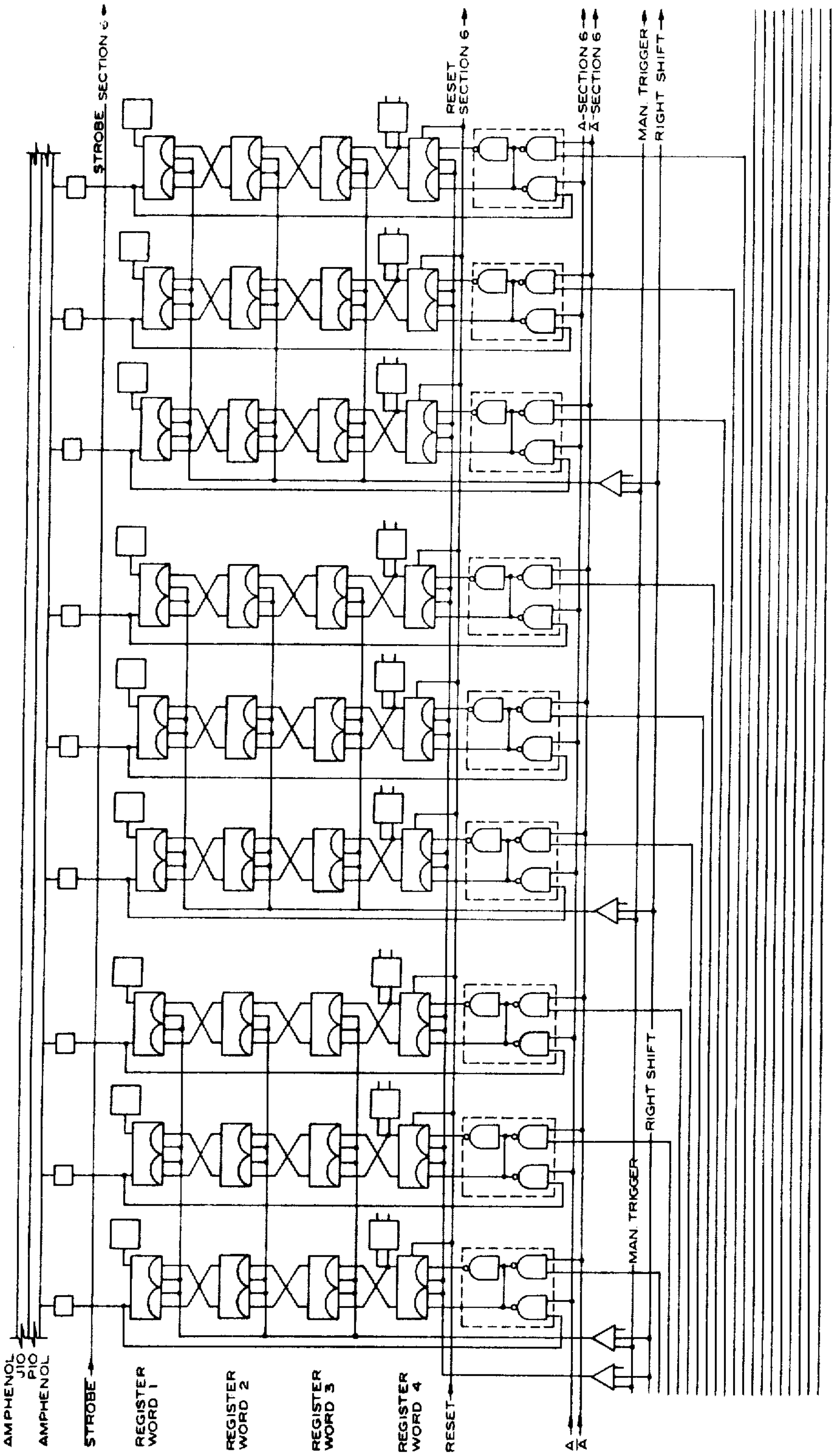
FIG. 9 is a schematic diagram of Interface A Section 5 logic.
Figure 10:
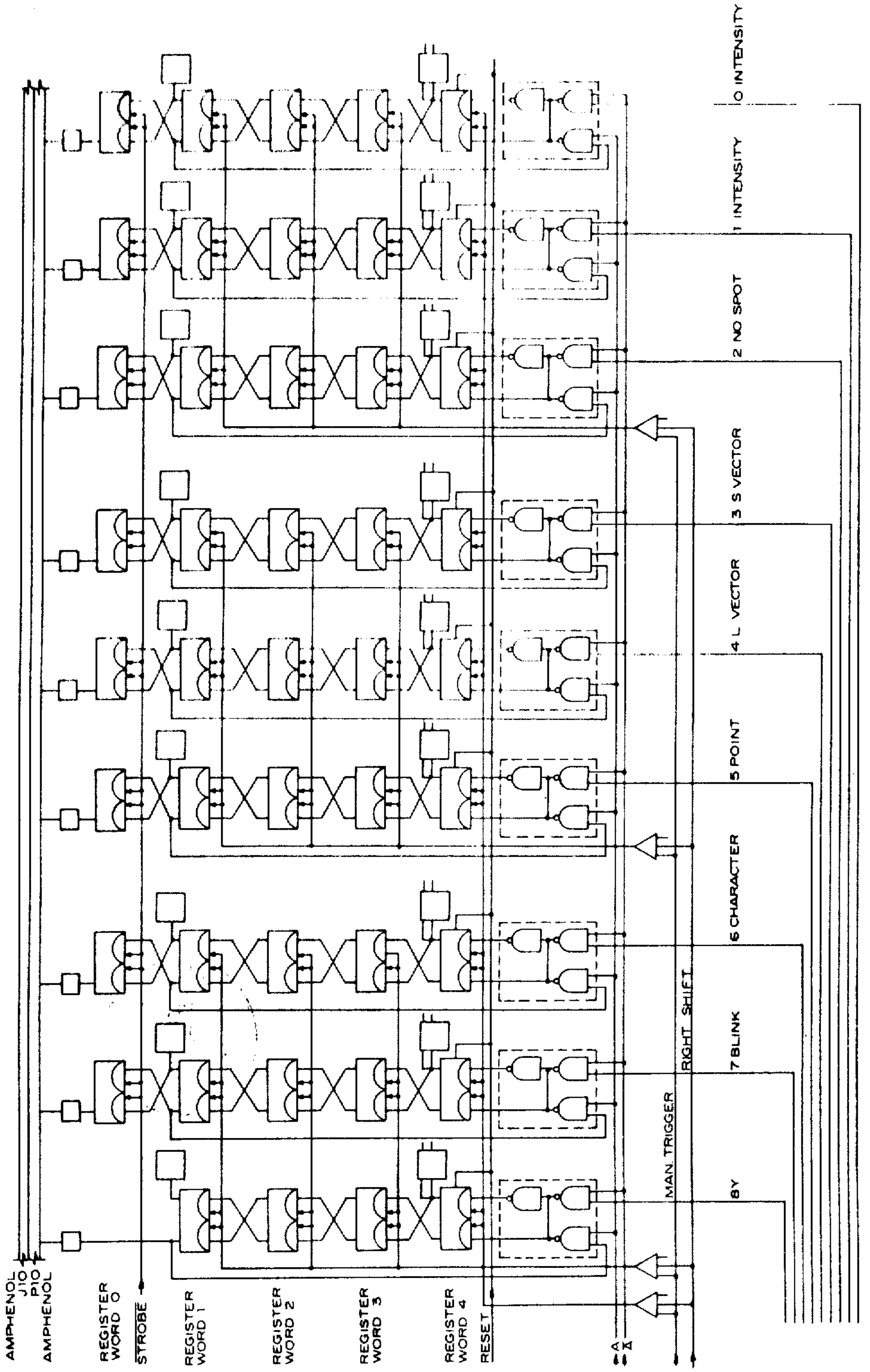
FIG. 10 is a schematic diagram of Interface A Section 6 logic.

The output functions [[(A5G30) ($\overline{OA'}$) or Test OA] + (FFE)] ($\overline{FFRT}$) and (A5G30) ($\overline{OA'}$) or Test OA + $\overline{FFE}$) ($\overline{FFRT}$) provide the shift signals to the assembly register. Refer to FIGS. 4 and 6. The checkout circuitry inputs at A10B15 and A16G30 have no effect during normal operation. The OA (Output Acknowledge) generated signal (A5G30) ($\overline{OA'}$) or Test OA gated with the output of flip flop FFE (Flip Flop Enable) provides the source of shifting signals for entering the eight words from the computer. FFE enables the negative going edge of the OA generated signal to alternatively shift the left and right halves of the assembly registers. NAND gates A3G and A3D provide these shift signals in the functions [ [ (A5G30) ($\overline{OA'}$) or ($\overline{FFRT}$) and (A5G30) ($\overline{OA'}$) or Test OA + FFE) ]($\overline{FFRT}$) respectively. The falling edge of FFRT (Flip Flop Ready Trigger) provides the source of signals for dual shifting of both halves of the registers at the end of the READY-STROBE pulse. FFRT is triggered by the output of the READY-STROBE generator, and the fourth READY-STROBE is inhibited by the fourth READY-STROBE INHIBIT.

The STROBE pulses from the READY-STROBE generator are inverted through the NAND gate A10B, the fourth READY-STROBE is inhibited and ANDed with the SYNC at the STROBE output amplifiers A1D and A11D. This forms the SYNC-STROBE. The positive going edge of the READY signal is used to form 4-microsecond READY-STROBE. The positive going edge of the READY-STROBE will bring the READY signal down to ground (Logic 0). The READY-INHIBIT inhibits the READY-STROBE generator when certain checkout procedures are in effect.

If a short plan-position indicator (PPI) presentation is being displayed, the sweep vector may be completed and the ready line raised before the assembly register is completely loaded from the computer. To prevent premature output to BDG 18 it is necessary to NAND READY and READY ENABLE (RE). The READY signal is NANDed with RE in NAND gate A16A. The output from A16A then goes to the READY-STROBE generator. The RE signal inhibits the READY signal from causing any shifting or strobing until all eight words have been entered from the computer. The delay multivibrator A17C is used to delay the counter output from enabling READY signal processing until assembly register shifting has been completed.

The OA counter is a binary counter which gives an output when eight OA's have been counted. The counter's output is used to control the READY signal and to limit the number of requests for computer words to eight.

Checkout circuitry is provided so that the source of a problem can be investigated if trouble appears in the display function. The first of the two checkout procedures that may be initiated provides for checking data flow from computer 20 through the assembly register. In this procedure, the operator activates a first mode (MODE 1) switch on the Interface A panel to stop the data assembly automatically when all four words of a single group are in the assembly register. Activating a second mode (MODE 2) switch allows the operator to stop data assembly at the end of a cycle and before entrance of new words from the computer. As an example, four rows of neon lights may be placed on the panel of the interface to represent the bit positions of two words currently in Register Word 4 and Register Word 1 of the assembly register. The top rows may correspond to Word 4 and the bottom rows may correspond to Word 1. The neon light switches that are lit in each row represent the binary "1" states of the bits in the words. By pressing a manual trigger three times, the operator causes each word in the assembly register to appear successively on the light switches of Word 1. Thus, by knowing the computer output words, and by use of the lights, he can determine whether words coming from the computer are being assembled correctly in the register.

The second checkout procedure examines the data flow from the assembly register to BDG 18. Here the operator may stop the assembly in the register and disengage the input interface from computer 20. If all four words of a group are in the assembly register, he may use those for checkout, or using appropriate checkout switches, he can remove all words from the register and press various light switches to enter his own digital words into the registers, which will then form the output to the display. After four display command-words are in the register, the operator activates a CYCLE switch, which transfers his "command-words" (or those of the computer) to BDG 18 and automatically cycles those same four words again and again through the register and onto CRT 22. In this way, the operator can determine from the CRT display whether words formed in the register reach the basic display properly. This checkout procedure is valuable also in testing the reliability of the register-to-display data transfer over long periods of time, in that a group of words can be allowed to cycle at length, the display being checked occasionally by the operator.

Figure 5:
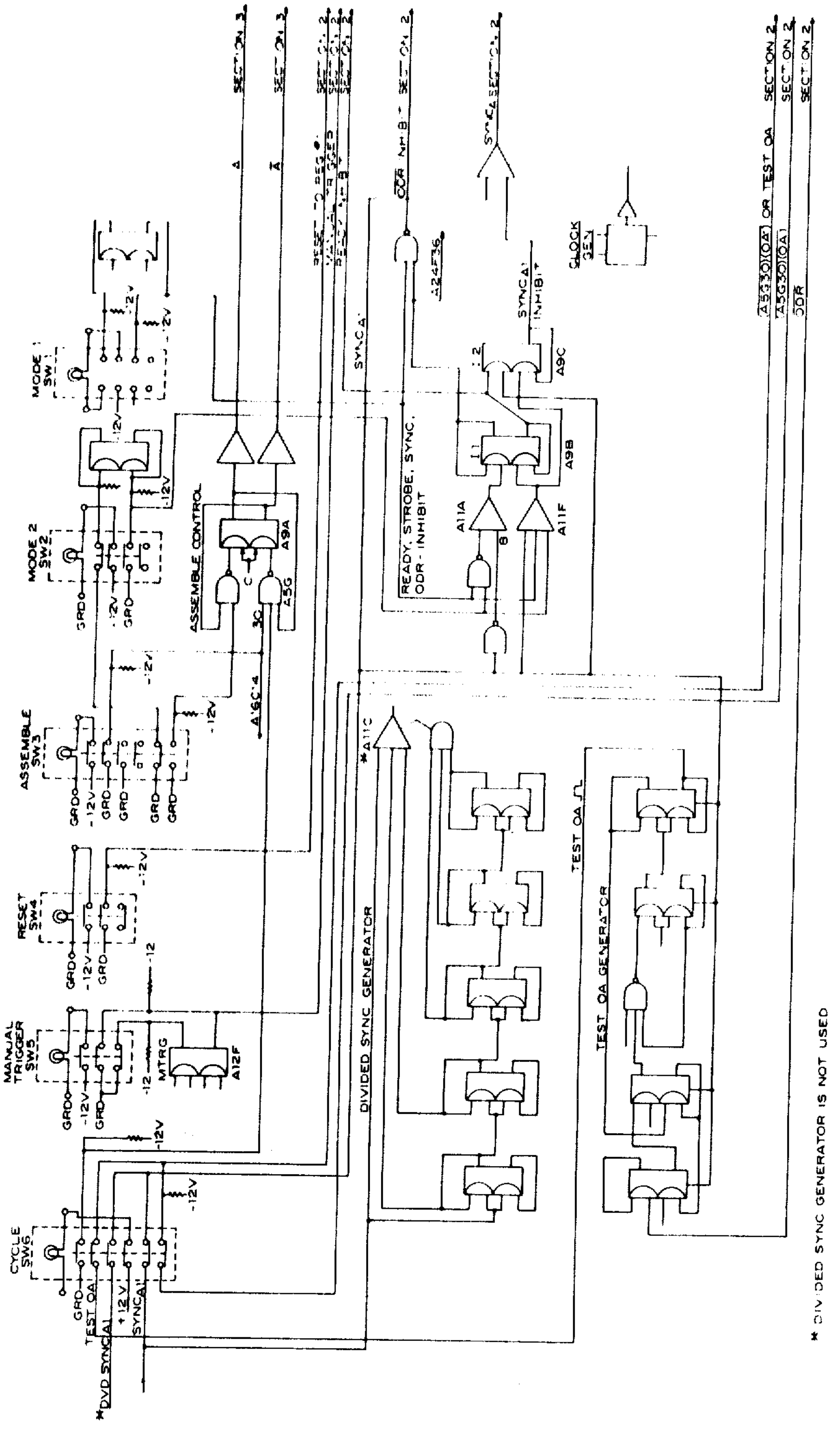
FIG. 5 is a schematic diagram of Interface A Section 1 logic.

As an example, the switches shown in FIG. 5 which may be included in the present invention are:

MODE 1—Holds four 36-bit words as assembled in the register for inspection.

MODE 2—Holds the portion of the register operating cycle where Word 4 is in Register Word 1, and both halves of all the other registers contain the eighth computer word.

ASSEMBLY—Inhibits the normal signal inputs to the register, thus holding information for MODE 1 and MODE 2 inspection. ASSEMBLY also enables the operator to set data into the register manually. This is done prior to cycling.

RESET—Allows words in Register Word 4 to be cleared so that new words can be entered.

MAN TRIG—Shifts all 36-bit words forward one register. This switch, with RESET is used to manually load the assembly register.

CYCLE—Cycles register words while computer input is blocked. (Assembly switch must be released before cycling starts.)

After a word is entered manually into Register Word 4, it may be shifted to Register Word 3 by activating the MAN TRIG switch. In this way, all four registers may be filled with 36-bit words manually. Flip flop MTRG is used to eliminate any contact bounce on MAN TRIG switch. Activation of the CYCLE switch will then cycle the words into the BDG, and the effects of the four words can be viewed on CRT 22. The CRT display will show if the display input-output logic circuitry and BDG circuitry are functioning properly. It also furnishes a means of checking BDG 18 when the computer is not available.

When MODE 1 switch is activated, the transfer is stopped when four words to be output to BDG 18 are assembled in the assembly register. The READY-STROBE and $SYNC_{A1}$ signals are inhibited so that after the next eight words are entered from the computer, the data in the assembly register will not change. Thus, the assembly of four words from the eight computer words can be viewed on the neon light switches.

When the MODE 2 swtich is activated, the data transfer is stored at the end of a transfer cycle when Word 4 is in Register Word 1 and both halves of the other registers contain the eight computer words. ODR is inhibited as well as the READY-STROBE and $SYNC_{A1}$ signals.

When the ASSEMBLY switch is activated ODR, READY-STROBE, and $SYNC_{A1}$ are inhibited, the same as when the MODE 2 switch is activated. In addition, flip flop Assembly Control (AC) is set to the true state.

When switches ASSEMBLY, MODE 1, and MODE 2 are not activated, the switches' output to A11F allows the $SYNC_{A1}$ pulse the reset flip flops 11 and 12. When these switches are activated, the reset pulses $SYNC_{A1}$ are inhibited. This assures that the flip flops are in the normal, i.e., logical false state when switch contact is made and inhibits the $SYNC_{A1}$ pulses from resetting the flip flops once the switches initiate the desired output waveforms. Any one of these switches, MODE 1, MODE 2, ASSEMBLY will inhibit resetting of flip flops 11 and 12.

Flip flop AC is normally zero (false). ASSEMBLY, in conjunction with CYCLE, control FFAC (flip flop ASSEMBLY control). When ASSEMBLY is pushed down (activated) flip flop AC becomes true.

The FFAC output is used to inhibit ODR's from going to the computer and channels the cycling from the computer output to internal test. Cycle will not make FFAC go to true state until ASSEMBLY and CYCLE are released. Release of ASSEMBLY with CYCLE not activated will reset FFAC.

The outputs from flip flop AC control the source of data going to Register Word 4. Under normal operation, data from the computer is steered into Register Word 4. When the ASSEMBLY switch is activated, the data in Register Word 1 is steered into Register Word 4 and the computer data lines are inhibited. In effect, the four flip flops making up one bit position in the assembly register become a circular shift register.

In order for the assembly register to form a complete cycle (e.g. return the data to its original starting position) during checkout, an extra shift (FIG. 6) is necessary. This extra shift appears after the SYNC-STROBE shift and before the normal set of shift signals. The first extra shift upon cycling is inhibited to provide the order necessary for the output of the Register Word 4 by the SYNC-STROBE.

The 1 kc rate of the $SYNC_{A1}$ pulse which initiates the output cycle to the display group was considered to be too fast a rate for CRT 22 presentation when cycling in the checkout mode. The $SYNC_{A1}$ pulse was divided by 32 to give a presentation rate of approximately 33 cps.

During the checkout cycle, the OA signal coming from the computer must be simulated. This signal is created in the TEST OA generator. The TEST OA generator has the same basic logic as the READY-STROBE generator. The TEST OA generator output is taken off at a different point and has a 2 microsecond-wide pulse.

Figure 11:
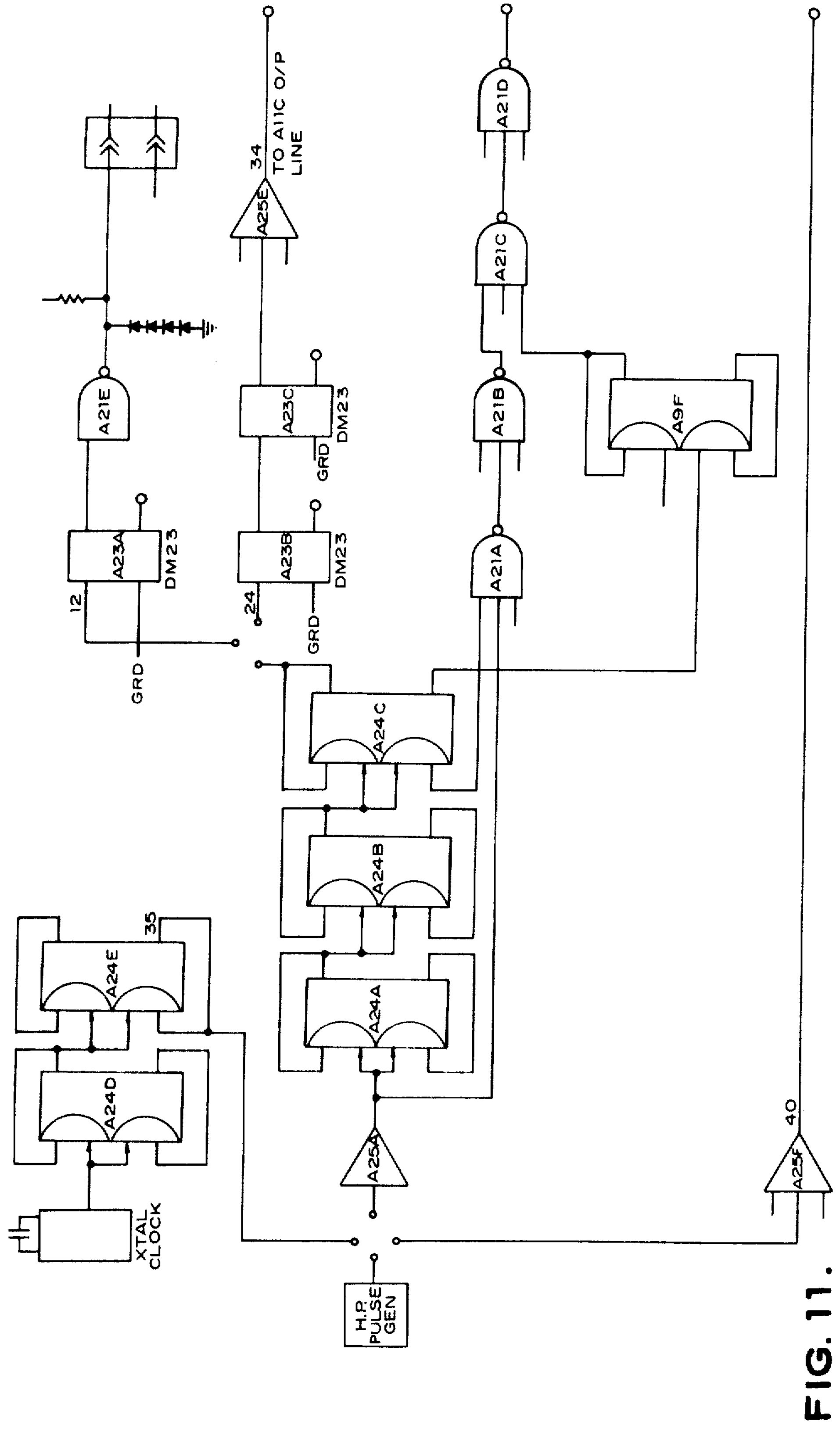
FIG. 11 is a schematic diagram of Interface A trouble shooting circuitry.

In troubleshooting the design and original wiring of the logic unit, it was found convenient to generate some test signals for troubleshooting purposes. See FIG. 11.

The SYNC signal from A25F40 may have its width and pulse rate controlled directly from an external pulse generator. The power amplifier A25F interfaces the external signal to the computer's logic requirements. The output A25F40 is usually connected to either A11A8 or A11C output line, with the normal output disconnected from A11C. Connecting to A11A8 injects the TEST SYNC signal into the system at the same point as the system $SYNC_{A1}$ pulse. Connecting to A11C output lines gives more direct control of the TEST SYNC pulse rate and provides greater range of pulse rate when desired.

When the pre-sync signal as well as a sync signal is desired, A25F40 may be connected to A23A12 and A23B24. When doing this, A25E34 must be connected to A11C output line.

An alternate TEST SYNC signal can be generated which is related to a simulated READY signal. The associated circuitry is activated to power amplifier A25A. These signals can be used when no READY signal is available from the basic display unit. The pulse rate of the external generator determines the period between READY signals; the TEST SYNC signal period is then a multiple of the READY signal period.

A clock card and a two-flip-flop-binary counter are used to make up an optional fixed rate internal sync source. The output from A24E35 may be connected to A23A12 and A23B24. This internal generated sync source cannot be used to generate simulated READY signals.

INTERFACE B

The purpose of Interface B 16 is to provide the means by which an operator can originate and transmit instructions and data to computer 20. The computer controls operation of the Multitrack Radar System. Thus, Interface B provides for interfacing man (in a control role) with the balance of the Multitrack Radar System.

Interface B 16 may contain a control panel consisting of switches, indicator lights and a track ball. By manipulating these switches and the track ball, the display console operator can control the radar system.

Physically and functionally, Interface B may be made up of two major parts, the switches and track ball on the control panel and the logic circuitry behind the control panel. Various momentary switches, pushlock switches, rotary switches and digit switches may be activated on the control panel. When activated, these switches generate different codes in the words passed to the computer from the logic drawer circuitry. Movement of the track ball loads the X and Y counters, and these counter values are output to the computer.

Output to the computer 20 is in the form of four 18-bit words. The first three words of the four-word group are always generated by the same switches. The fourth word is made up by the alternate outputs of two different switch groups. The first three words are referred to as words 1, 2, and 3. The alternating fourth words are referred to as words 4 and 8. Output of these four-word groups are at a nominal 1 kc rate.

Figure 12:
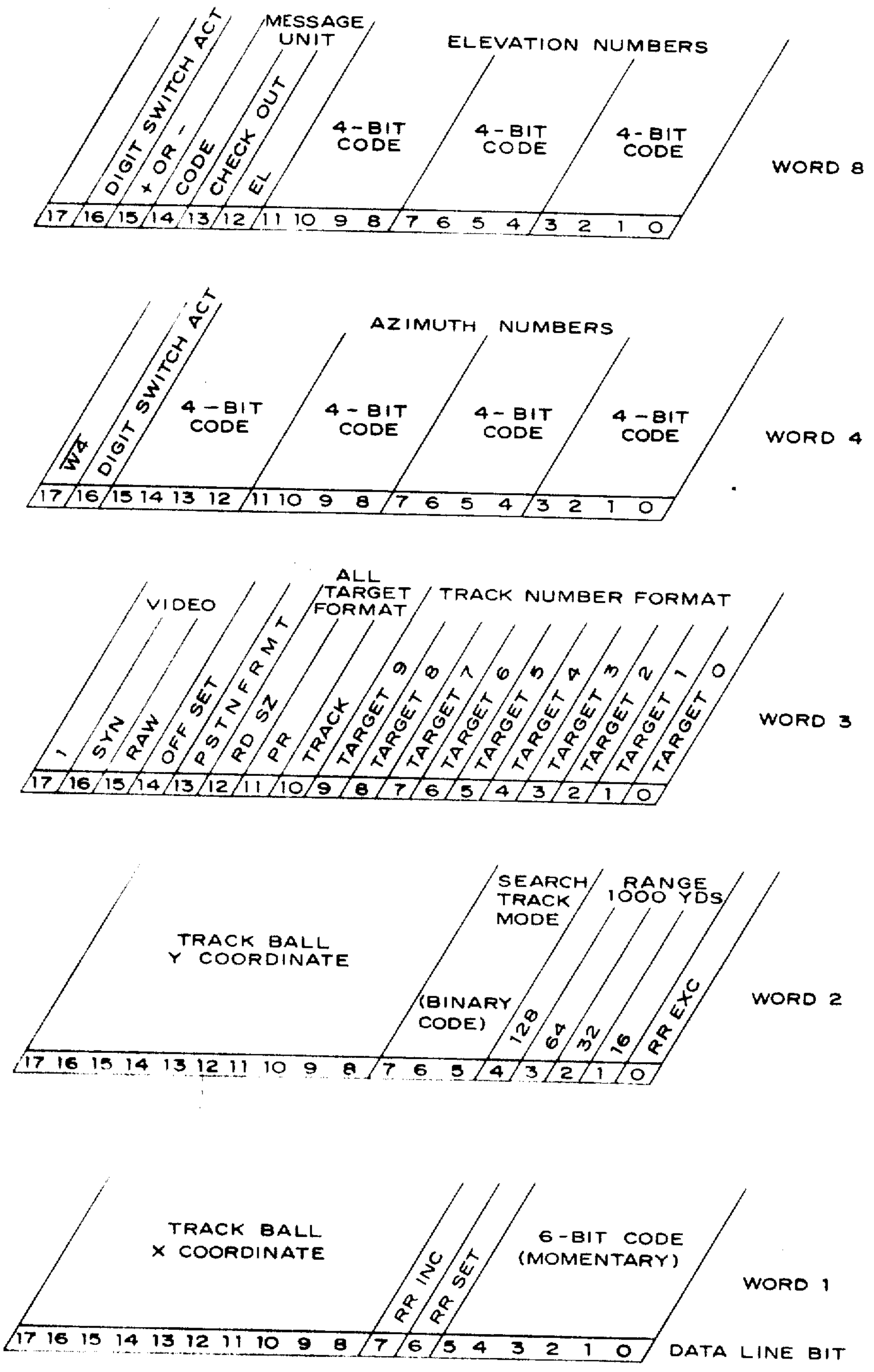
FIG. 12 diagrammatically shows the function composition of the four word group of the second interface (Interface B)

FIG. 12 illustrates the function composition of the four word group. Word 1 contains a 10-bit code from the track ball X counter, two 1-bit codes from the pushlock switches and a 6-bit code from the momentary switches. Word 2 contains a 10-bit code from the track ball Y counter, a 3-bit binary code from the radar search track mode selector switch, a 4-bit code from the range selector switch, and a 1-bit code from the pushlock switch. Word 3 contains 18 1-bit codes from pushlock switches. Word 4 contains four 4-bit BCD codes from the azimuth digit switches, a 1-bit code from a pushlock switch, and a 1-bit code from the output of power amplifier W4 to designate the word group as Word 4. Word 8 contains three 4-bit BCD codes from the elevation digit switches, three 1-bit codes from a digit switch message unit, one 1-bit code from a digit switch, and a 1-bit code from a pushlock switch.

Figure 13:
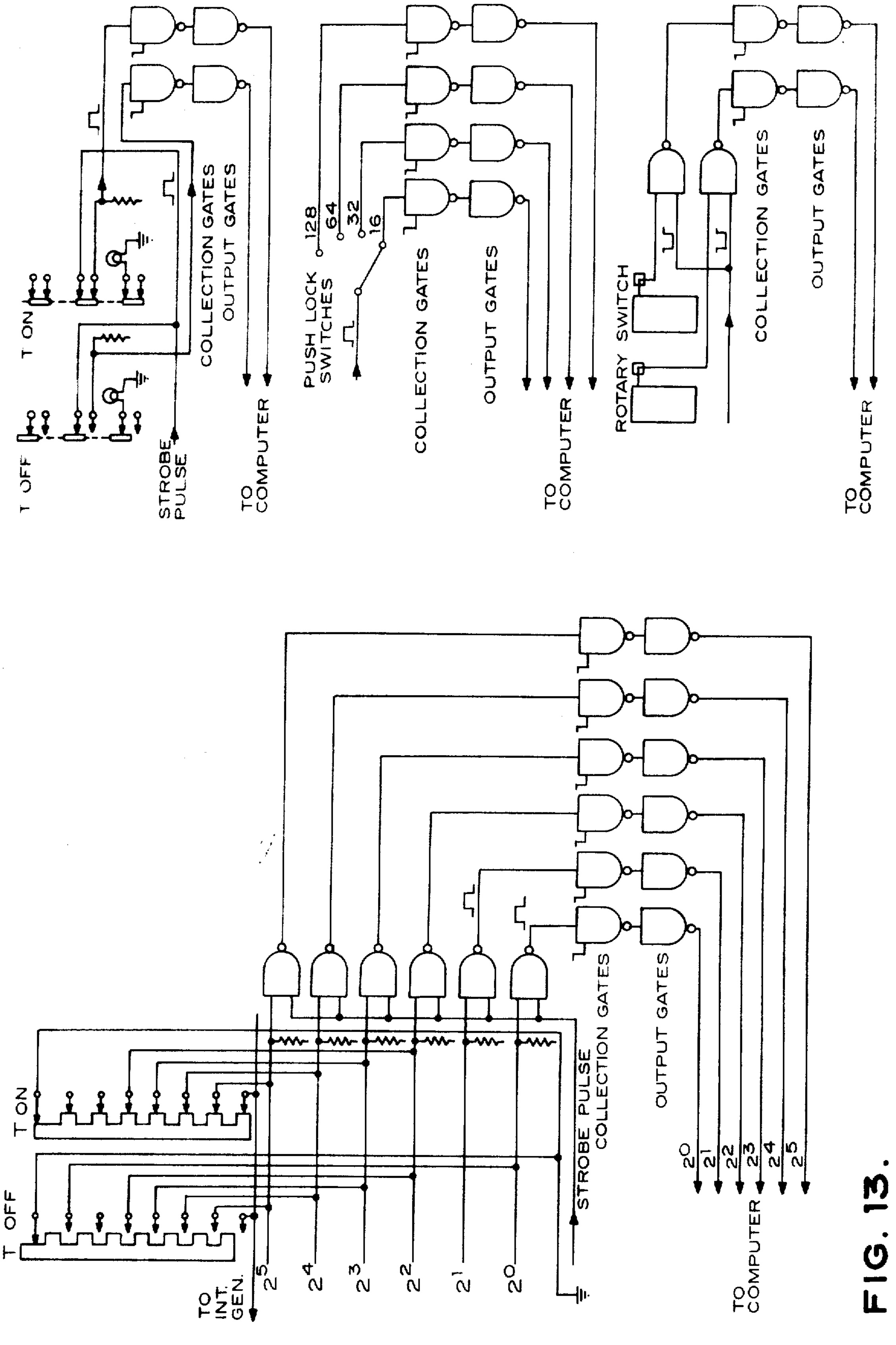
FIG. 13 is a schematic diagram of the switch circuitry of Interface B.

Two different methods of forming outputs are used in the switch circuitry, FIG. 13. One method is used for pushlock, rotary, and digit switches, another method is used for momentary switches for the counter flip flops of the track ball circuitry.

The pushlock, rotary and digit switches, when activated, close contacts and allow a pulse to pass to the collection gates. The collection gates collect the strobe pulses for the various words and route them to the output gates. The pulse is generated during one of the four-word time periods and is processed and routed to one of the input data lines of the computer. The pulse thus forms a "Logic 1" in a particular bit position of one of the four words making up the output.

The momentary switches and counter flip flops of the track ball circuitry are used in a different manner. They provide control levels (true or false states) which are NANDed with a pulse timed for the appropriate output word time. The True state at the NAND gate input will allow the timed pulse (STROBE pulse) to be processed through the NAND gates. The output of these NAND gates are then processed similarly to the strobed pulses passed through the switches mentioned above.

Figure 16:
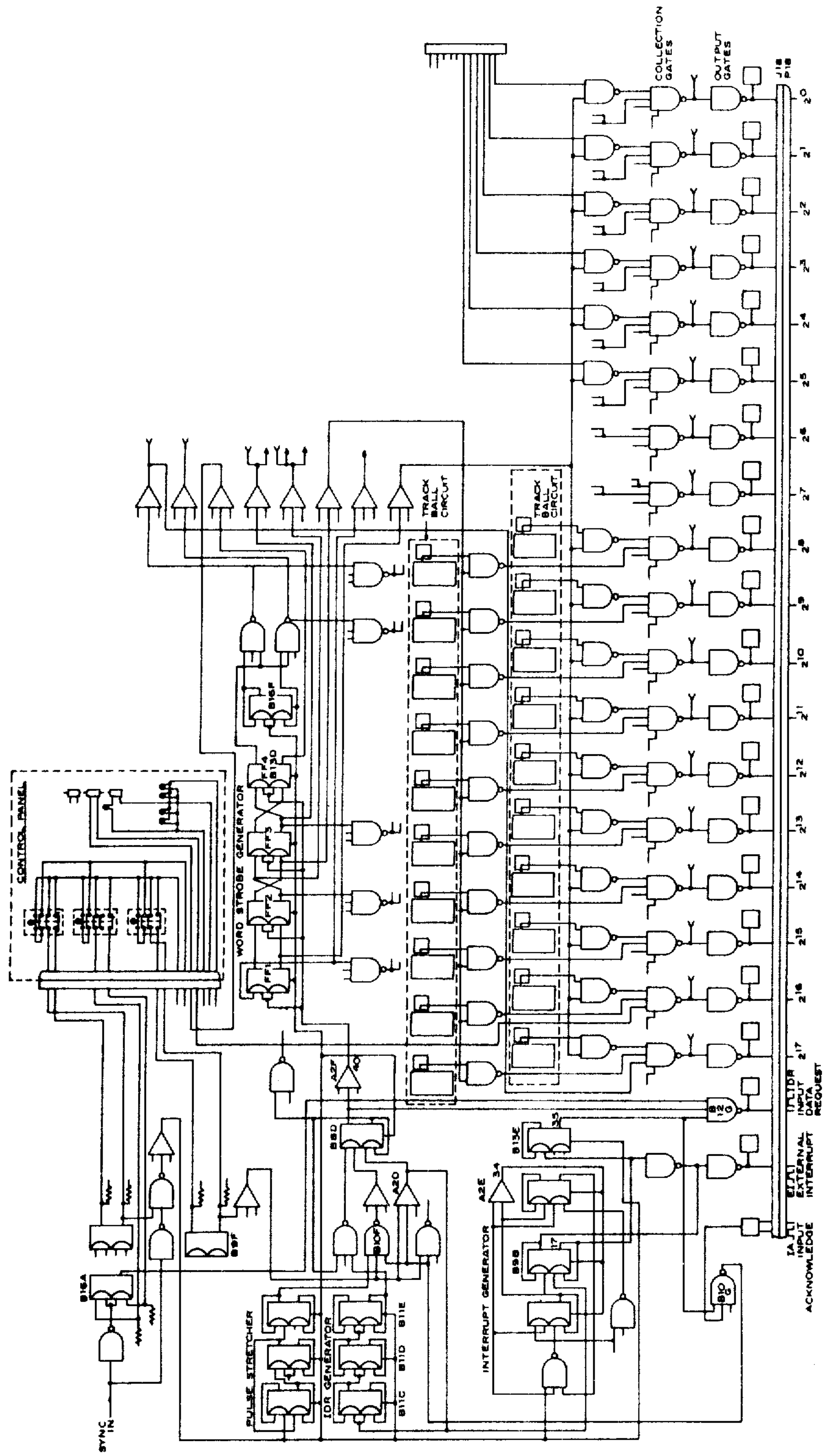
FIG. 16 is a schematic diagram of Interface B logic.
Figure 17:
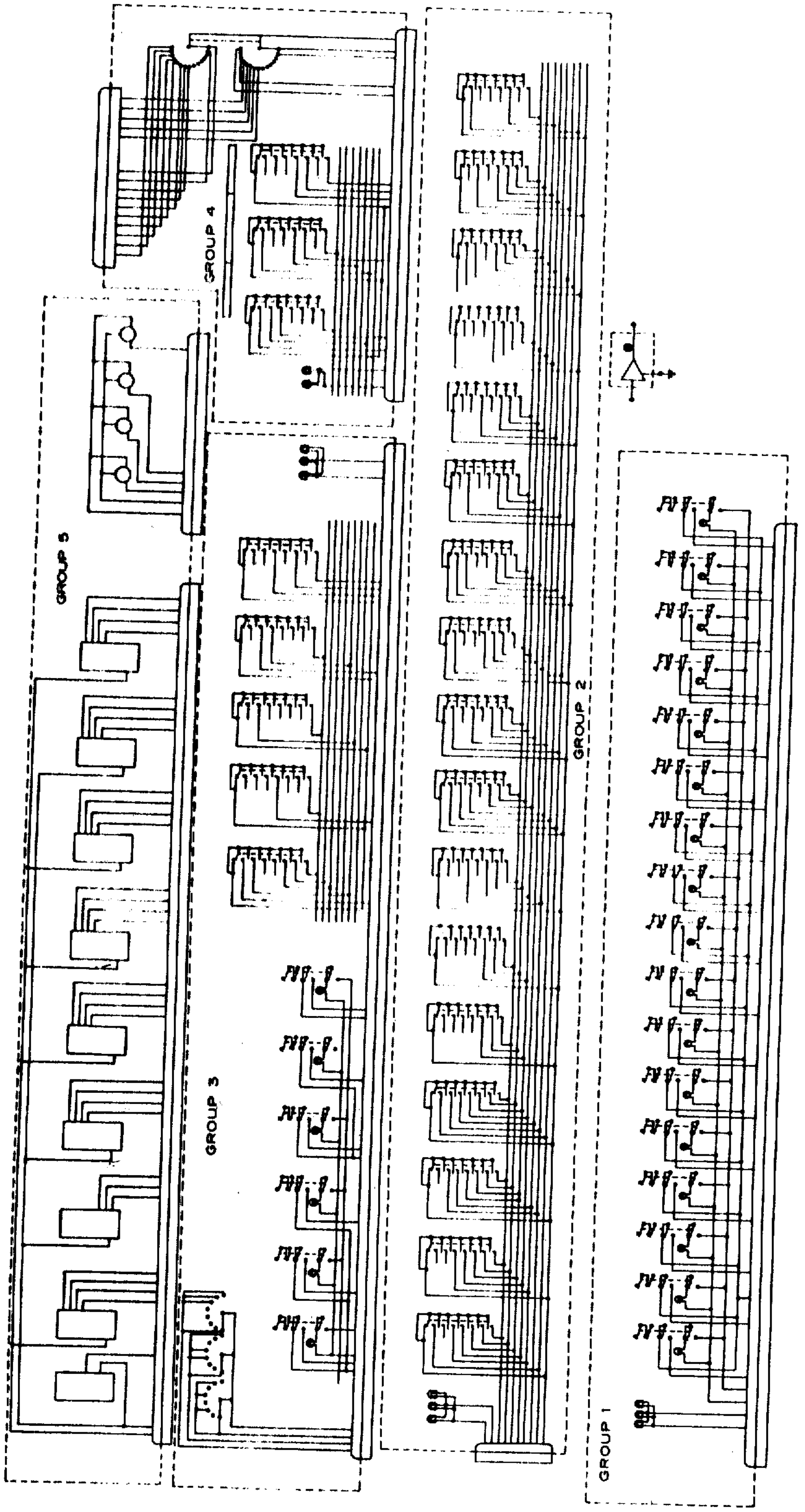
FIG. 17 is a schematic diagram of Interface B switch circuitry.

The pushlock switches, when activated, make contact and allow a positive pulse to pass to the collection NAND gates. See FIGS. 13, 16, and 17. A second set of contacts on the pushlock switches turns on a switchlight, indicating that the switch is active.

The rotary RANGE switch is wired to generate a 4-bit output. Each of the four bits represent a different range selection. The rotary SEARCH-AND-TRACK MODE switch uses the same type of signal flow as the RANGE switch. The only difference is that it is wired to furnish a 3-bit octal code. The appropriate STROBE pulse is routed to a combination of its outputs depending upon the selection.

The true state of the track ball counter flip flops, NANDed with the appropriate STROBE pulse provides outputs to the collection gates. The momentary switches generates a 6-bit binary code. When no momentary switch is active, all six bits are "Logic 1" or true state. By activating a momentary switch, some of the bit positions are switches to "Logic Zero," or false state.

The logic circuitry (FIG. 16) provides three main functions. It generates strobing pulses that sample switch states, it outputs this information to the computer and it provides for operator checkout.

The rising edge of the $SYNC_B$ signal is delayed by the $SYNC_B$ pulse stretcher circuitry. The modified $SYNC_B$ is called $SYNC_{B'}$ and the rising edge is delayed from 1 to ½ microseconds. The stretched $SYNC_B$ pulse is used to accommodate momentary switching which generates External Interrupt (EI) signals.

When a momentary switch is activated, an External Interrupt (EI) is substituted for the next four Input Data Request (IDR) signal groups. The rising edge of the $SYNC_B$ pulse initiates the EI and allows time for inhibiting the output of IDR's initiated by the rising edge of $SYNC_{B'}$.

The input data request (IDR) generator circuitry creates four IDR's (provided they are honored by computer 20 in time) for each of the $SYNC_B$ signals generated.

$SYNC_B$ is NANDed with ($\overline{IA}$ + B16A) and $\overline{B9F}$ in NAND gate B10F. The rising edge of the NAND gate output triggers flip flop B8D. This provides the signal for raising the IDR control line. The understanding of this circuit operation during normal operating conditions can be simplified by ignoring the B16A and B9F signals coming from the checkout circuitry.

The rising edge of $\overline{IA}$ is used to set flip flop FF $\overline{IDR}$ (B8D) to zero and thus brings the IDR control line down.

The binary counter made up of flip flops B11C, B11D, and B11E inhibits flip flop FF $\overline{IDR}$ (B8D) from being set after four 1 A's have been counted.

The activation of a momentary switch enables the generation of an External Interrupt (EI) signal by the interrupt generator circuitry. The EI control line to computer 20 is raised to a computer logic true state (ground) and is lowerered to the false state (—4v) upon processing a computer generated IA (Input Acknowledge). The EI signal is generated for only one four-word group to the computer for each momentary switch activation. The EI signal takes the place of what are normally four IDR signals of the four-word group. If a computer IA is not generated, the next $SYNC_B$ pulse brings down the EI line to the computer upon release of the momentary switch.

The $SYNC_B$ initiated EI occurs before the $SYNC_B$ initiated IDR. The $\overline{EI}$ signal at B9B17 triggers FF B13E. B13E 35 is NANDed with $\overline{IDR}$ signal in NAND gate B12G to inhibit the raising of four IDR's during EI generation.

The IA-initiated output from A2D resets FFIG2 (B9B) to zero. This brings the EI control down. A2E34 is used to reset the interrupt generator circuitry. This provides for the possibility that the computer cannot honor the EI during the time between switch activation and release. If this occurs, the momentary switch will have to be activated again.

The word STROBE generator counts the $\overline{IDR}$ signals to provide the correct states for strobing out switch-generated data. The four flip-flops, FFW1, FFW2, FFW3, and FFW4, 8 form a shift register. A "1" in a particular flip flop designates the respective word state and generates enabling levels to allow certain switch settings to be passed to the computer. The fourth word of each four-word group is alternately channeled to different switches to form the fourth and eighth words.

A2F40 ($\overline{IDR}$) triggers the four flip flops making up the word strobe generator. The $SYNC_B$ pulse resets FFW2, FFW3, and FFW4 to "0" and FFW1 to "1" prior to the first $\overline{IDR}$ generation. The $SYNC_B$ pulse alternately sets flip flop B16F to "1." The outputs of B16F are NANDed with FFW4, 8 to produce the word 4 and word 8 signals. The appropriate outputs from the word strobe generator are amplified by power amplifiers and routed to the collection NAND gates.

The various strobing signals generated by the word STROBE generator are routed to sample the switch and flip flop states. They are then collected in expanded NAND gates prior to output to the computer. There is a collection NAND gate for each output data line to the computer. There are 18 NAND gates which feed computer data lines 0 to 17. Each of these NAND gates can accept five lines of data to provide for words 1, 2, 3, 4, and 8.

The output NAND gates and special bias circuitry form the logic's output circuitry for driving the computer input lines. Ths output circuitry provides the necessary voltage level shifting in going from versalogic to logic used in computer 20.

Figure 14:
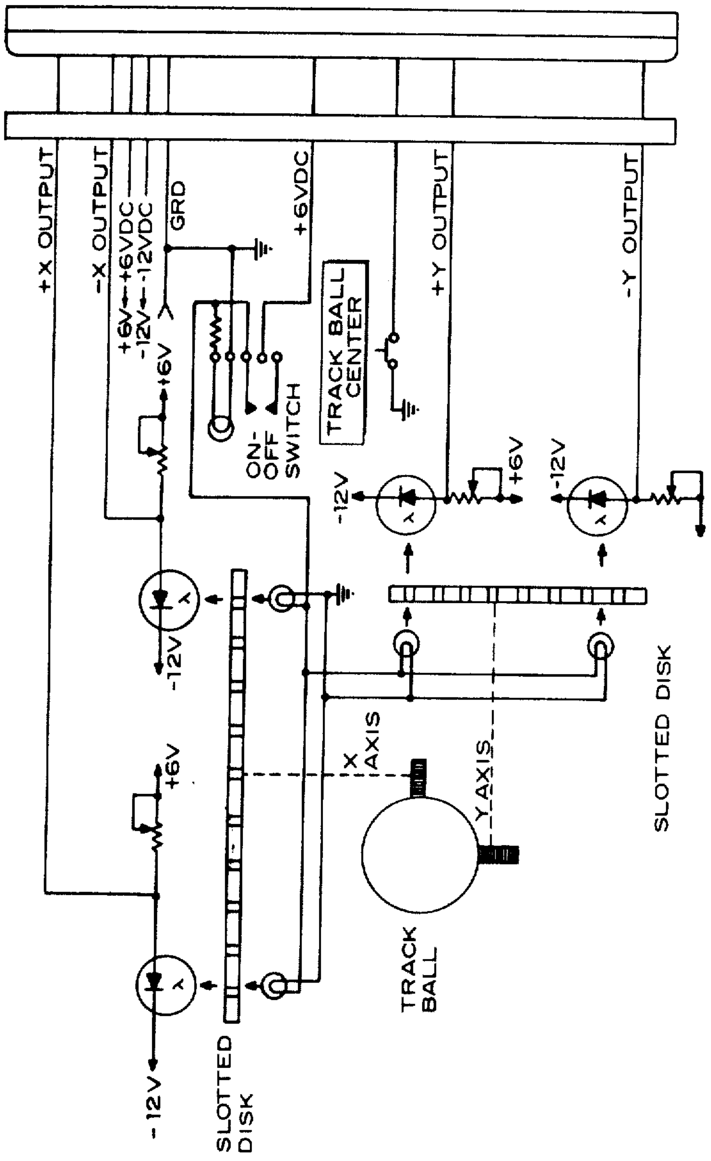
FIG. 14 is a schematic diagram of the track ball generator of Interface B.

The track ball is physically and functionally made up of two major parts, the track ball generator (FIG. 14) located in the control panel, and the track ball *x* and *y* counters located in Section A of the logic circuitry. The track ball generator makes use of a manually movable ball (track ball) which controls an incremental encoder. The incremental encoder for each axis consists of a light source and two photodiodes. The light is interrupted by a slotted disk driven by the track ball. Thus, as the track ball is moved, the photodiodes alternately turn on and off. Connecting the diodes to a voltage source generates pulses across load resistors as the track ball is moved. An unlabeled track ball ON-OFF switch controls the light source. Excessive aging of the photodiodes is prevented by turning the light source off when the track ball is not being used. The "Track Ball Center" switch may be located on the track ball generator housing. It is for resetting the *x* and *y* counters to give then a value which centers a ball tab symbol on CRT 22.

The track ball *x* and *y* counters are binary ripple up-down counters. Logically, the *x* and *y* counters are identical, so only the *x* counter is discussed in detail. The track ball (TB) generator functions to provide the track ball counters with a positive pulse for each coordinate unit of change in the *x* and *y* direction caused by movement of the track ball. There are two inputs and two outputs from the track ball generator; these signals correspond to movement of the track ball in the position or negative directions. If the *x* and *y* position is changed, both the +TB input and the −TB input will receive alternately positive and negative inputs. For changes in the positive direction, the +TB input negative pulses (one for each unit of change) lead those of the −TB input. Simularly, for changes in offset position in the negative direction, the negative pulses in the −TB input lead those in the +TB input. The two inputs will both be negative at a given time, but as the *x* or *y* position is changed, one of the two inputs will go positive before the other.

Figure 15:
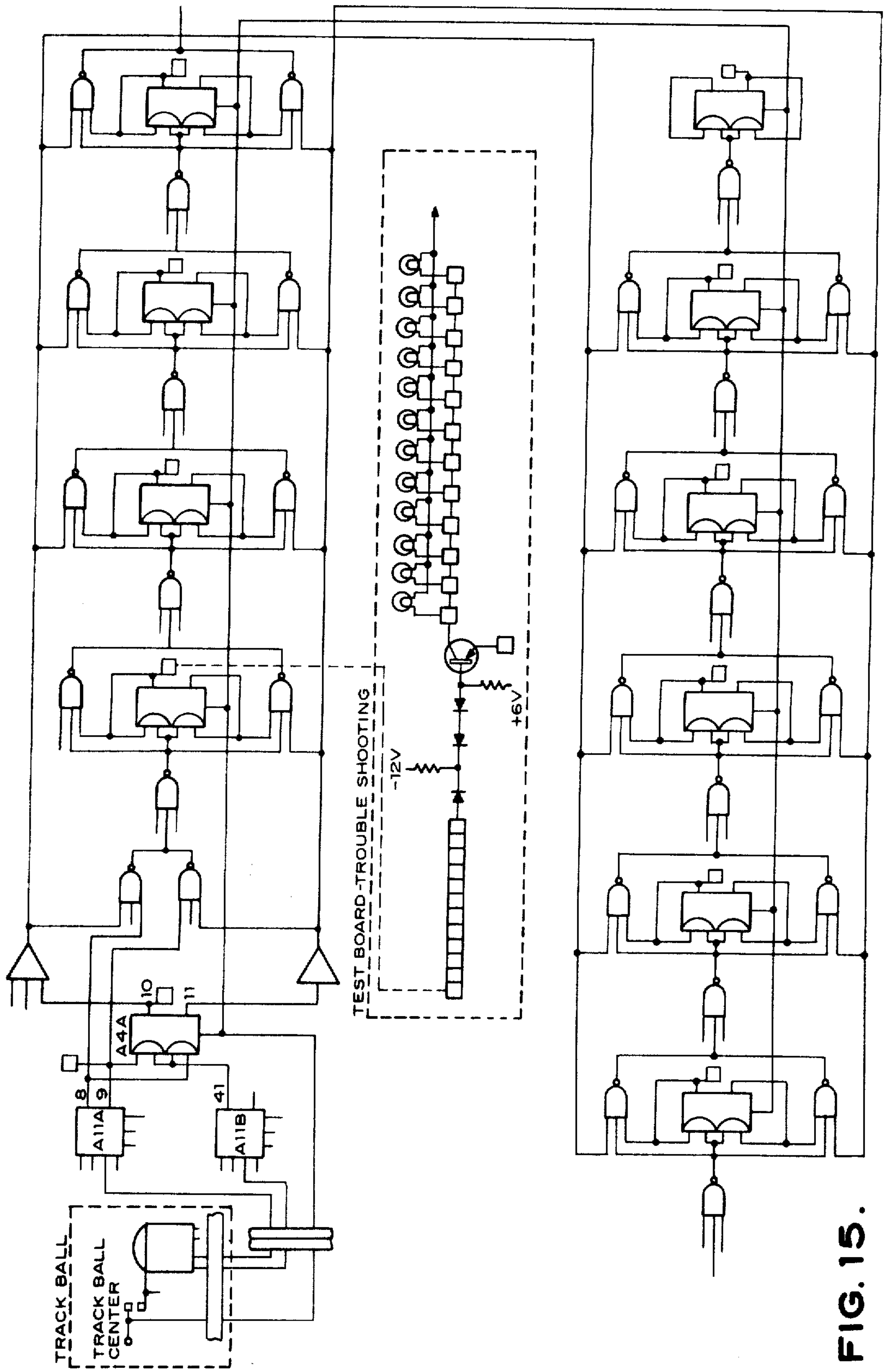
FIG. 15 is a schematic diagram of the track ball counter logic of Interface B.

The track ball incremental encoder output signals are first changed in square waves by the Schmitt triggers before entering the *x* counter. Movement of the track ball in the + or − direction will determine which of the two inputs to the *x* counter will be leading. Flip flop A4A (FIG. 15) will be set or reset depending on which input is leading. The state of flip flop A4A determines, through gating, if the counter should be incremented or decremented for each coordinate unit of change. The total effect is to create an up and down counter for segments of a ball movement.

When the relationship between A11A9 and A11B41 is as illustrated below, A4A is in the true state. The false output from A4A (A4A11) isolates the counter flip flop false outputs from the following counter flip flops. The counter then acts like the simple binary up counter shown below:

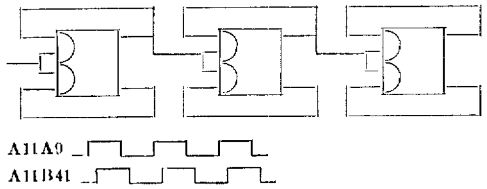

When the relationship between A11A8 and A11B41 is as illustrated below, A4A is in the false state. The true output from A4A (A4A10) isolates the counter flip flop true outputs from the following counter flip flops. The counter then acts like the simple binary ripple down counter shown below:

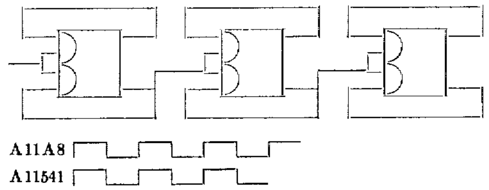

The operator can manually check-out Interface B 16 from the display console control panel by means of switches and indicator lights. Output data and control lines to the computer, plus the word STROBE generator flip flops have indicator lights on the check-out portion of the control panel. During the check-out operation, the operator can test and determine that the logic circuitry is functioning correctly by activating various switches and checking the results on the indicator lights.

The operator can also check that output data to the computer is correct by comparing the indicator lights with lights on the computer when using a check-out computer program.

As an example, Interface B 16 may include the following switches to perform the following functions:

DVD SYNC INHIBIT—Inhibits normal operation and communication with the computer, thus initiating the first phase of the check-out mode.

MAN SYNC—Simulates a $SYNC_B$ pulse and sets the word STROBE generator to the Word 1 state.

MAN IA—Simulates the computer IA signal and steps the word strobe generator to the next word state.

In the check-out mode, when DVD SYNC INHIBIT is activated, flip flop B16A is triggered to the true state by the rising edge of the next $SYNC_B$ pulse. B16A (B16A11) is then used to inhibit $SYNC_B$ and the IDR output to the computer. B10G is forced to give a true output which allows MAN IA generated signals to be injected into the logic circuitry. B10G also prohibits any computer-generated IA's from entering the logic after $SYNC_B$ has been inhibited. Switches MAN SYNC and MAN IA are tied to flip flop outputs to eliminate contact bounce. An internal $SYNC_B$ generator is provided. An XC11 clock output is divided by a three flip flop binary counter to give a pulse rate of approximately 1 kc. Or, as an alternative, the $SYNC_B$ signal can be generated externally with the use of a pulse generator.

What is claimed is:

1. A multitrack radar display console for visually presenting radar information processed by a digital computer, comprising;

radar transmitting and receiving means providing an output in the form of electrical digital signals, a programmed digital computer coupled to the output of said transmitting and receiving means for providing an output of said information in the form of digital words consisting of 18 binary digits, first interfacing means coupled to the output of said computer for converting said computer digital words into digital words consisting of 36 binary digits and providing an output of said converted words, display means coupled to said first interfacing means output for converting said words consisting of 36 binary digits into a visual display which can be viewed by an operator, manually controllable means included in said first interface means for holding in time the next set of words received from said computer and cycling said held words through said first interfacing means and said display means on manual command, said means for holding including means for testing the computer's ability to assemble the words and for disconnecting the computer from said console, said first interface means including test means for repetitively cycling a preselected word set through said first interface means and said display means for testing the display means ability to accurately display the information contained in said preselected word set and the first interfacing means ability to accurately transfer the information to said display means, and second interfacing means controlled by said operator and coupled to said computer for transmitting instructions and data to said computer.

2. The console of claim 1 wherein said first interfacing means comprises;

an assembly register for converting said computer digital words into binary words compatible with said display means, and a timing circuit.

3. The console of claim 1 wherein said display means comprises;

a cathode ray tube for displaying the information contained in said words consisting of 36 binary digits, a symbol generator for converting words consisting of 36 binary digits which contain symbol information into signals which are convertible by said cathode ray tube into visual representations of said symbols, and a vector generator for converting words consisting of 36 binary digits which contain vector information into signals which are convertible by said cathode ray tube into visual representations of said vectors.

4. The console of claim 1 wherein said second interfacing means comprises;

code generating means controlled by the operator for directing the operation of said computer, and logic circuitry which converts information from said code generating means into signals compatible with said computer for outputting to said computer.

5. The console of claim 1 wherein:

said first interfacing means comprises an assembly register for converting said computer digital words into binary words compatible with said display means, and a timing circuit;

said display means comprises a cathode ray tube for displaying the information contained in said words consisting of 36 binary digits, a symbol generator for converting words consisting of 36 binary digits which contain symbol information into signals which are convertible by said cathode ray tube into visual representations of said symbols, and a vector generator for converting words consisting of 36 binary digits which contain vector information into signals which are convertible by said cathode ray tube into visual representations of said vectors; and said second interfacing means comprises code generating means controlled by the operator for directing the operation of said computer, and logic circuitry which converts information from said code generating means into signals compatible with said computer for outputting to said computer.

* * * * *